Patented Oct. 10, 1950

2,524,803

UNITED STATES PATENT OFFICE 2,524,803

PRODUCTION OF A BASIC CHROMIC CHLORIDE

Ralph K. Iler, Cleveland Heights, Ohio, assignor to E. I. du Pont de Nemours & Company, Wilmington, Del., a corporation of Delaware No Drawing. Application March 26, 1947, Serial No. 737,421

7 Claims. (Cl. 23—87)

This invention relates to processes for producing chromium salts and is more particularly directed to processes in which a solution of chromium trioxide in concentrated hydrochloric acid is commingled with a lower aliphatic alcohol, whereby reaction occurs to produce a basic chromic chloride, and optionally, adding a carboxylic acid, whereby a water soluble complex compound of the Werner type in which a trivalent nuclear chromium atom is coordinated with the carboxylic acido group is produced.

United States Patents 2,273,040 and 2,356,161 describe processes for producing complex chromium compounds of the Werner type in the substantial absence of free water. The processes described in these patents effected the reaction between a carboxylic acido group and a suitable chromium compound in a non-aqueous solvent such as carbon tetrachloride. The use of any organic solvent entails considerable expense as compared with the use of water as a solvent. If the non-aqueous solvent is not compatible with water it must, of course, be completely removed if the ultimate product is to be used in aqueous dispersion or solution. On the other hand, organic solvents which are compatible with water, such as alcohol, are usually volatile and inflammable and precautions need to be observed in their handling. Thus, although the processes of the above-mentioned patents are highly efficacious and give products of excellent quality, it would be advantageous if the necessity for avoiding the presence of free water could be overcome.

Now according to the present invention processes for producing basic chromium salts, and particularly complex compounds of the Werner type in which trivalent nuclear chromium atoms are coordinated with carboxylic acido groups are provided in which the reaction is carried out in an aqueous system by commingling a lower aliphatic alcohol and a solution of chromium trioxide in concentrated hydrochloric acid, whereby a basic chromic chloride is produced, and optionally effecting contact between the solution and a carboxylic acido group whereby a complex compound of the acido group and the basic chromium chloride is produced.

The chemical reactions involved include a reduction of the hexavalent chromium trioxide to a lower valence state by oxidation of the alcohol and a coordination between the reduced chromium atoms and the carboxylic acido groups. The nuclear chromium atoms in the complex are in the trivalent state and when formed by the reaction described are particularly reactive to form the coordination complexes. It will be understood that the oxidation-reduction and the coordination reaction may occur substantially simultaneously, the latter being dependent on the presence of a coordinatable carboxylic acido group.

The Werner complex compounds produced according to this invention are substantially identical with those obtained according to the above mentioned U. S. patents or are similar, differing only in the particular carboxylic acido group which is coordinated into the molecule.

The concentrated hydrochloric acid which is used to dissolve the chromium trioxide should contain more than about 16% by weight of HCl and preferably should contain from 20 to 37.0% HCl. The constant boiling mixture with water, which contains 20.22% HCl has been found very satisfactory.

The concentration of chromium trioxide in the hydrochloric acid solution may be considerably varied. Good results are obtained using as little as 12% $CrO_3$ by weight and as much as 35% $CrO_3$ by weight. When the basic chromium chloride produced by the alcohol reduction is subsequently to be converted to a complex acido compound it is preferred to maintain the $CrO_3$ content of the solution at a low enough figure that the basic chromium chloride does not separate out, but since the basic choride is very soluble this is not a disadvantageous limitation.

The proportion of hydrogen chloride to chromic oxide in the solution determines the degree of basicity of the chromium chloride produced, that is, the number of chlorine atoms per chromium atom. For a basic chromium chloride having 33⅓% basicity, that is, 2 chlorines and 1 hydroxyl per chromium atom, the molar ratio would be $2HCl : CrO_3$. For a more basic chromium chloride this ratio would be decreased and for a less basic chromium chloride it would be increased.

The lower aliphatic alcohol which is used to reduce the chromium preferably should contain not more than 4 carbon atoms and be a monohydric alcohol. Methanol, normal propanol, or normal, secondary, tertiary or isobutyl alcohol may be used. Ethanol and isopropanol are particularly satisfactory.

The amount of alcohol used ordinarily should be about the stoichiometric proportion theoretically required to reduce the hexavalent chromium present in the solution to the trivalent state, the equation for ethyl alcohol being:

$$3C_2H_5OH + 4CrO_3 + 8HCl \rightarrow$$
$$3CH_3COOH + 4CrCl_2OH + 5H_2O$$

It will be noted that when ethyl alcohol is used as the reducing agent acetic acid is formed. This acetic acid coordinates with the chromium of the basic chromium chloride to form chromium acetato chlorides. By subsequently adding stearic acid or substances capable of giving stearato groups the acetato groups may be replaced with stearato groups on the complex but there often remains a residuum of acetato groups which are undesirable if the complex is to be used for imparting water repellency to hydrophilic substances.

It is particularly preferred for the above reason to use a secondary alcohol such as isopropanol because the product of the oxidation then is a ketone, such as acetone in the case of isopropanol, which does not coordinate with the chromium and is readily removed from the product. The equation for the reaction with isopropanol is as follows:

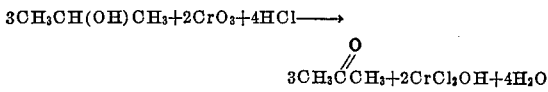

Irrespective of which lower aliphatic alcohol is used the oxidation-reduction reaction is highly exothermic. It is therefore preferred first to prepare the solution of chromic oxide in hydrochloric acid and then to run this solution into the alcohol gradually, with agitation, under reflux conditions adapted to return any volatilized alcohol to the process. The refluxing action thus provides the necessary cooling. Alternatively, cooling may be provided directly in the reaction vessel.

It is highly desirable to use a substantial excess of the lower aliphatic alcohol to act as a solvent for the reactants and the products of the reaction. Another solvent may of course be used but this necessitates a solvent removal step and complicates the process. On the other hand, an excess of the alcohol provides an ideal solvent and favors high yields, based on chromium.

When the basic chromium chloride produced by the foregoing method is to be converted to a coordination complex with an organic acido group the proportion of chlorine atoms united with the trivalent chromium by primary valence bonds must be in the range from about 1.5 to about 3.0, with a corresponding proportion of hydroxyl groups to satisfy the 3 primary valences of the chromium. Thus, a basic chromium chloride having two chlorine atoms per chromium will contain one hydroxyl per chromium. It is particularly preferred that the proportion of chlorine per chromium be from about 1.85 to 2.5. Especially excellent results have been obtained using two chlorine atoms per chromium.

To convert the basic chromium chloride to a coordination complex with an acido group there is added a suitable source of such acido group to the basic chromium chloride preferably dissolved in an excess of the alcohol used for the reduction of the chromium. Of course, another suitable solvent for the basic chromium chloride may be used at this point. The free acid or an acid compound such as a hydrolyzable ester may be used as the source of acido groups. Thus one may add stearic acid, for instance, to a basic chromium chloride in isopropanol solution prepared as above described. It is advantageous to effect such addition and the formation of the complex at a somewhat elevated temperature and desirable heat economies can be achieved by adding the stearic acid immediately following the formation of the basic chromium chloride, whereby a portion of the heat of reaction of the oxidation-reduction reaction is recovered.

The proportion of carboxylic acid to add is governed by the number of acido groups which it is desired to have coordinated with the chromium atom. For practical purposes it has been found that a proportion of acido groups to chromium atoms of about 0.5:1 is as high as it is necessary to go in producing the complex.

The processes of this invention are applicable to the preparation of chromium coordination complex compounds of the Werner type with any carboxylic acid. The acid may be aliphatic, as in the case of acetic, or it may be aromatic, such as benzoic. It may be a short chain acid such as butyric or a long chain acid such as stearic. It may be saturated, as in the case of propionic, or unsaturated, as in the case of oleic. It may be monocarboxylic, or it may be polycarboxylic as in the case of maleic and adipic. Representative of other carboxylic acids which may be used are lauric, palmitic, capric, undecoic, tridecoic, myristic, pentadecoic, margaric, nondecoic, arachidic, undecylenic, myristelenic, palmitolenic, linoleic, linolenic, elaeostearic, clupanodonic, abietic, naphthenic, naphthoic, and similar carboxylic acids. A compound of the acid, such as an ester or salt, which can liberate the free acid under the conditions of the coordination reaction is, of course, equivalent to the free acid.

The nature of Werner-type complex chromium compounds and the nomenclature applied to them is described fully in the above mentioned U. S. Patents 2,273,040 and 2,356,161. By deleting the suffix "-ic" from the name of a carboxylic acid and adding the suffix "-ato" a system of naming the acido groups coordinated with the chromium and hence for naming the chromium complexes, is provided. Thus, stearic acid gives stearato groups and the complex is called stearato chromic chloride.

The properties of the complexes formed vary with the character of the coordinated acido group. The long chain acido groups, such as stearato groups, make the complex extremely useful for providing a high degree of water repellency to hydrophilic substances. On the other hand, the short-chained groups may have special characteristics imparting special usefulness. For instance, unsaturated chains in coordinated acido groups, such as occur in beta furyl acrylic acid groups retain their ability to interpolymerize with ethylenic-type polymers and hence to form a chemical bond between the chromium and the polymer.

It is often desirable to provide the user of the chromium complex compound with a solution of the compound in a non-aqueous solvent. This solvent may be the excess lower aliphatic alcohol from the oxidation-reduction reaction and the coordination reaction. Since there is water present in the original hydrochloric acid solution and also there is some water formed during the reaction it is desirable to dehydrate. This may be accomplished by processes with which the art is familiar but a particularly preferred method used to dehydrate an isopropanol-water mixture is to add isopropyl ether, distill off a ternary mixture of isopropyl ether-isopropanol-water which upon condensation separates into a water-rich phase and an ether-rich phase, and gravitationally separate off the water layer and return the ether layer to the product through a reflux column.

The invention will be better understood by reference to the following illustrative examples.

Example 1

In 19.2 parts by weight of 36% hydrochloric acid there was dissolved 10.0 parts by weight of chromic oxide. When a homogeneous solution was obtained, after 15 minutes stirring at room temperature, this mixture was added continuously to 81.5 parts by weight of specially denatured alcohol, Formula No. 1. The reaction was quiet until the alcohol reached the boiling point after which it had to be cooled to prevent violent sputtering when the $CrO_3$/HCl was added.

There was then added 14.2 parts by weight of stearic acid (½ mol for each mol of $CrO_3$) and the mixture was refluxed ½ hour after which it was adjusted to 88 parts by weight by adding alcohol, the resulting solution having a chromium content of 6%. The product gave clear, green solutions when added to water.

Example 2

A solution was made up by dissolving 5.53 parts by weight of chromic oxide in 3.67 parts of water and this solution was added to 13.23 parts by weight of 20° Bé. hydrochloric acid solution (31.45% HCl). This solution was then run into 23.72 parts by weight of isopropanol at reflux temperature of 80° C. A highly exothermic reaction occurred. The batch was agitated during the reaction. Refluxing was continued for 30 minutes.

The thus-prepared basic chromium chloride solution in excess isopropanol was then converted to a complex compound with stearic acid by cooling it to 50° C. and adding 7.89 parts by weight of stearic acid. The mixture was refluxed again for 0.25 hour and the acetone formed by oxidation of isopropanol was distilled off through fractionation. The batch was then dehydrated by cooling to room temperature, adding 30 parts by weight of isopropyl ether, and distilling off a ternary mixture of isopropyl ether, isoprapanol, and water. This ternary was homogeneous in the vapor phase but separated into two phases upon condensation. The water phase contained about 85% water and the ether phase contained about 87% ether. This condensate was taken through a gravitational separator, water was drained off from the bottom and discarded, and isopropyl ether layer was recirculated from the top of the separator to the top of the reflux column.

The product obtained was a clear green solution of stearato chromic chloride in isopropanol, was stable upon standing, dissolved in water to give a clear solution, and imparted remarkable water repellency to paper treated with the aqueous solution.

Example 3

A solution was made up by dissolving 215.5 parts by weight of chromic oxide in 142 parts of water and this solution was added to 504 parts by weight of 20° Bé. hydrochloric acid solution (31.45% HCl). After mixing, this solution was then run into 893 parts by weight of isopropanol at reflux temperature of 80° C. Cooling water is run through the jacket to compensate for the highly exothermic reaction period. Refluxing was continued for 0.5 hour.

The thus prepared basic chromium chloride solution in excess isopropanol was then converted to a complex compound with methacrylic acid by adding 108.5 parts by weight of methacrylic acid. The mixture was refluxed again for 0.5 hour after which the product was cooled to 30° C. and packaged.

The product obtained was a clear bluish-green solution of methacrylato chromic chloride in isopropanol, was stable on standing, and dissolved in water to give a clear solution.

I claim:

1. In a process for producing a basic chromic chloride, the steps comprising preparing an aqueous solution containing, by weight, from 12 to 35 per cent of chromium trioxide and more than 16 per cent of hydrogen chloride, and mixing this solution with a monohydric aliphatic alcohol containing not more than four carbon atoms.

2. In a process for producing a water-soluble complex compound of the Werner type in which a trivalent nuclear chromium atom is coordinated with a carboxylic acido group, the steps comprising preparing an aqueous solution containing, by weight, from 12 to 35 percent of chromium trioxide and more than 16 percent of hydrogen chloride, mixing this solution with a monohydric aliphatic alcohol containing not more than four carbon atoms, and thereafter mixing with the resulting solution a carboxylic acid.

3. In a process for producing a basic chromic chloride, the steps comprising preparing an aqueous solution containing, by weight, from 12 to 35 percent of chromium trioxide and more than 16 percent of hydrogen chloride, and mixing this solution with isopropanol.

4. In a process for producing a basic chromic chloride, the steps comprising preparing an aqueous solution containing, by weight, from 12 to 35 percent of chromium trioxide and more than 16 percent of hydrogen chloride, and mixing this solution with ethanol.

5. In a process for producing a water-soluble complex compound of the Werner type in which a trivalent nuclear chromium atom is coordinated with a carboxylic acido group, the steps comprising preparing an aqueous solution containing, by weight, from 12 to 35 percent of chromium trioxide and more than 16 percent of hydrogen chloride, mixing this solution with isopropanol, and thereafter mixing with the resulting solution a carboxylic acid.

6. In a process for producing a water-soluble complex compound of the Werner type in which a trivalent nuclear chromium atom is coordinated with a carboxylic acido group, the steps comprising preparing an aqueous solution containing, by weight, from 12 to 35 percent of chromium trioxide and more than 16 percent of hydrogen chloride, mixing this solution with isopropanol, and thereafter mixing with the resulting solution stearic acid.

7. In a process for producing a water-soluble complex compound of the Werner type in which a trivalent nuclear chromium atom is coordinated with a carboxylic acido group, the steps comprising preparing an aqueous solution containing, by weight, from 12 to 35 percent of chromium trioxide and more than 16 percent of hydrogen chloride, mixing this solution with isopropanol, and thereafter mixing with the resulting solution methacrylic acid.

RALPH K. ILER.

REFERENCES CITED

The following references are of record in the file of this patent:

UNITED STATES PATENTS

| Number | Name | Date |
| --- | --- | --- |
| 511,411 | Dennis | Dec. 26, 1893 |
| 1,157,668 | Boner | Oct. 26, 1915 |
| 1,924,129 | Michalek | Aug. 29, 1933 |
| 2,273,040 | Isler | Feb. 17, 1942 |
| 2,356,161 | Isler | Aug. 22, 1944 |

FOREIGN PATENTS

| Number | Country | Date |
| --- | --- | --- |
| 270,711 | Great Britain | Jan. 26, 1928 |

OTHER REFERENCES

Mellor's "A Comprehensive Treatise on Inorganic and Theoretical Chemistry," vol. 11, pp. 230, 231, and 375. Longmans, Green & Co., N. Y., publishers.

"Thorpe's Dictionary of Applied Chemistry," vol. 3, p. 109.